United States Patent [19]

Hayer

[11] 4,438,656
[45] Mar. 27, 1984

[54] POWER TRANSFER DEVICE

[76] Inventor: David R. Hayer, R.R. 1, Hoffman, Minn. 56339

[21] Appl. No.: 265,894

[22] Filed: May 20, 1981

[51] Int. Cl.³ .................. F16H 21/12; F16H 21/48; F16H 25/08; F03G 3/00
[52] U.S. Cl. ............................................ 74/63; 185/4; 185/27; 185/32
[58] Field of Search ................... 74/63, 64, 803, 797, 74/DIG. 9; 185/27, 32, 4

[56] References Cited

U.S. PATENT DOCUMENTS

| 1,767,311 | 6/1930 | Rohrbacher | 74/64 |
| 2,104,599 | 1/1938 | Wellenkamp | 74/660 |
| 4,019,396 | 4/1977 | Freehette | 74/64 |
| 4,179,943 | 12/1979 | Gamba | 74/64 |

FOREIGN PATENT DOCUMENTS

| 2262738 | 9/1975 | France | 74/DIG. 9 |
| 2298709 | 8/1976 | France | 74/DIG. 9 |

OTHER PUBLICATIONS

Movement #489, pp. 116-117, *Mechanical Movements*, Henry T. Brown, 1893.

Primary Examiner—Lawrence J. Staab
Assistant Examiner—Michael D. Bednarek
Attorney, Agent, or Firm—Harvey B. Jacobson

[57] ABSTRACT

An improved power transfer device utilizes an input power source supplemented by an unbalanced weight assembly which increases the torque on an output shaft as a function of load associated with the device. The input shaft is provided with a drive gear in operable engagement with an internal toothed ring gear, and the ring gear is provided with a plurality of diametrically opposed, radial extensions to which weight support arms are pivotably attached. The remaining free ends of the weight support arms are attached to the outer extensions of a cruciform support and are further in parallel alignment with and fixedly secured to elongated weights, such securement being offset from a central portion of the weights. A difference in load between the input shaft and output shaft results in the ring gear shifting in an unbalanced manner relative to the output shaft so as to deliver an additional torque to the shaft through the shifting of the unbalanced weights.

4 Claims, 4 Drawing Figures

POWER TRANSFER DEVICE

BACKGROUND OF THE INVENTION

1. Field of the Invention

The present invention relates generally to power transfer devices and more particularly pertains to a new and improved power transfer device which employs the use of shifting weights in combination with an input drive motor to increase the torque realized on an output shaft.

2. Description of the Prior Art

In view of the decreasing supplies of energy and the increased cost attendant therewith, the Federal government and private industry have instituted numerous programs designed to deal with these dwindling energy supplies. Effectively, most of these programs are directed towards improving the efficiency of machines which effectively transfer power from one source to another so as to accomplish a desired type and amount of work. In this respect, it can be appreciated that there are numerous avenues to be pursued which could result in increased efficiency of various machines, thereby to save energy, and in this respect, it has generally been recognized that unbalanced weights may be employed to rotate a shaft, provided that some means are present for shifting the weights in a desired manner. However, while the concept of utilizing unbalanced weights to rotate a shaft may be generally understandable by those with ordinary skill in the art, the method and manner of accomplishing the development of such machines has generally eluded both government and private industry. As such, it can be appreciated that there still exists a continuing need for power transfer devices which employ the use of unbalanced weights to assist in the output of a machine and, in this respect, the present invention substantially fulfills this need.

SUMMARY OF THE INVENTION

The general purpose of the present invention, which will be described subsequently in greater detail, is to provide a new and improved power transfer device that has all of the advantages of the prior art transfer devices and none of the disadvantages. To attain this, the present invention employs an input shaft which operably drives a pinion gear and associated plurality of idler gears mounted on a frame, such pinion gear being drivingly connected to an internal tooth ring gear associated with the invention. The ring gear includes a plurality of radially extending, diametrically opposed extensions to which are pivotably attached a plurality of weight support arms. The weight support arms have their respective free ends fixedly secured to elongated weight members and are further pivotably mounted within a cruciform support member which is rotatable in response to a rotation of the ring gear. In this respect, the weight support arms, which are fixedly secured to the elongated weights, are in parallel alignment with the weights and are attached at a point on the weights which is substantially removed from a central portion thereof. The weight support arms serve to transmit the rotative drive of the internal tooth ring gear to the cruciform support thereby to effect a rotation of the same, while an output shaft is operably driven by a rotation of the cruciform support.

In response to a load being applied to the output shaft of the invention, a resistance is imparted to the input shaft resulting in a shifting of the ring gear which in turn causes a concurrent shifting of the elongated weights from a vertical axis toward a more horizontal axis. As such, the elongated weights will tend to project from one side of the cruciform support while not so projecting from the other side, thereby to produce a weight imbalance on the output shaft, such weight imbalance serving to assist in the rotative power delivered to the shaft.

It is therefore an object of the present invention to provide a new and improved power transfer device that has all the advantages of similarly employed prior art power transfer devices and none of the disadvantages.

It is another object of the present invention to provide a new and improved power transfer device which may be easily and economically manufactured.

It is a further object of the present invention to provide a new and improved power transfer device which is both simple in construction and limited in the number of moving parts.

Still another object of the present invention is to provide a new and improved power transfer device which is efficient and reliable in its operation.

Yet another object of the present invention is to provide a new and improved power transfer device that will increase the efficiency of power driven machines.

Even another object of the present invention is to provide a new and improved power transfer device that is rugged and durable in its construction.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENT

Figure 1:
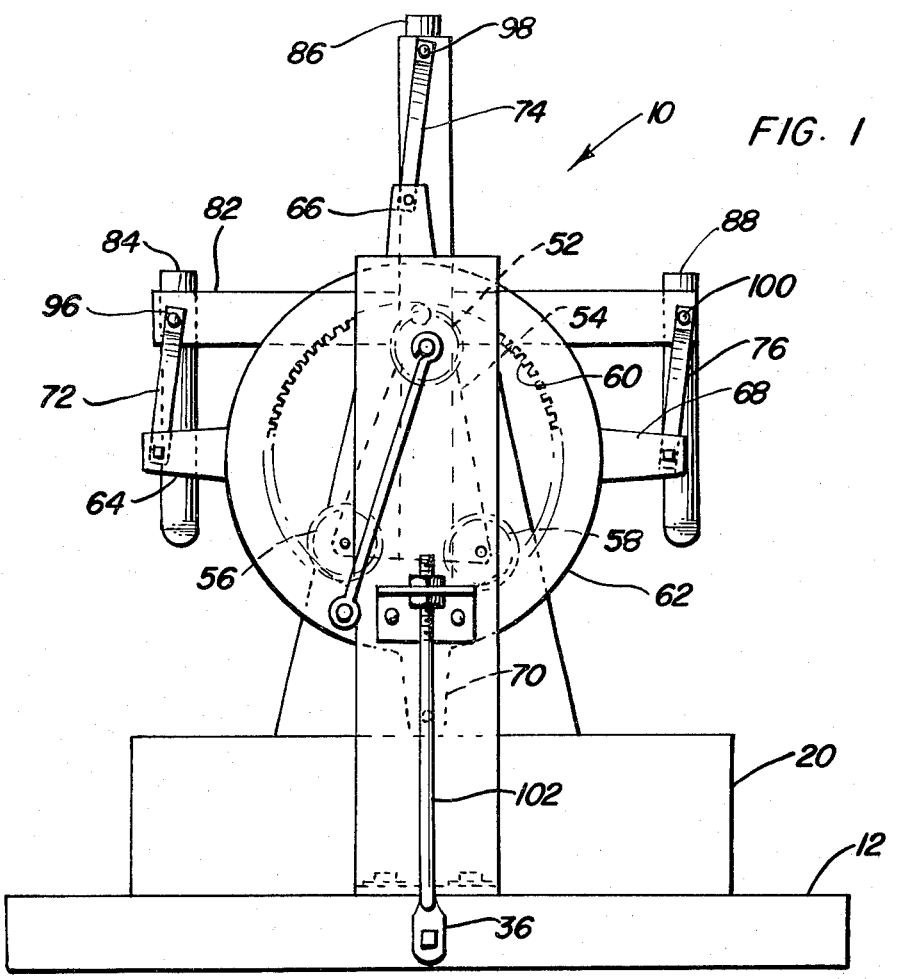
FIG. 1 is a front elevational view of the present invention shown in its no-load condition.
Figure 2:
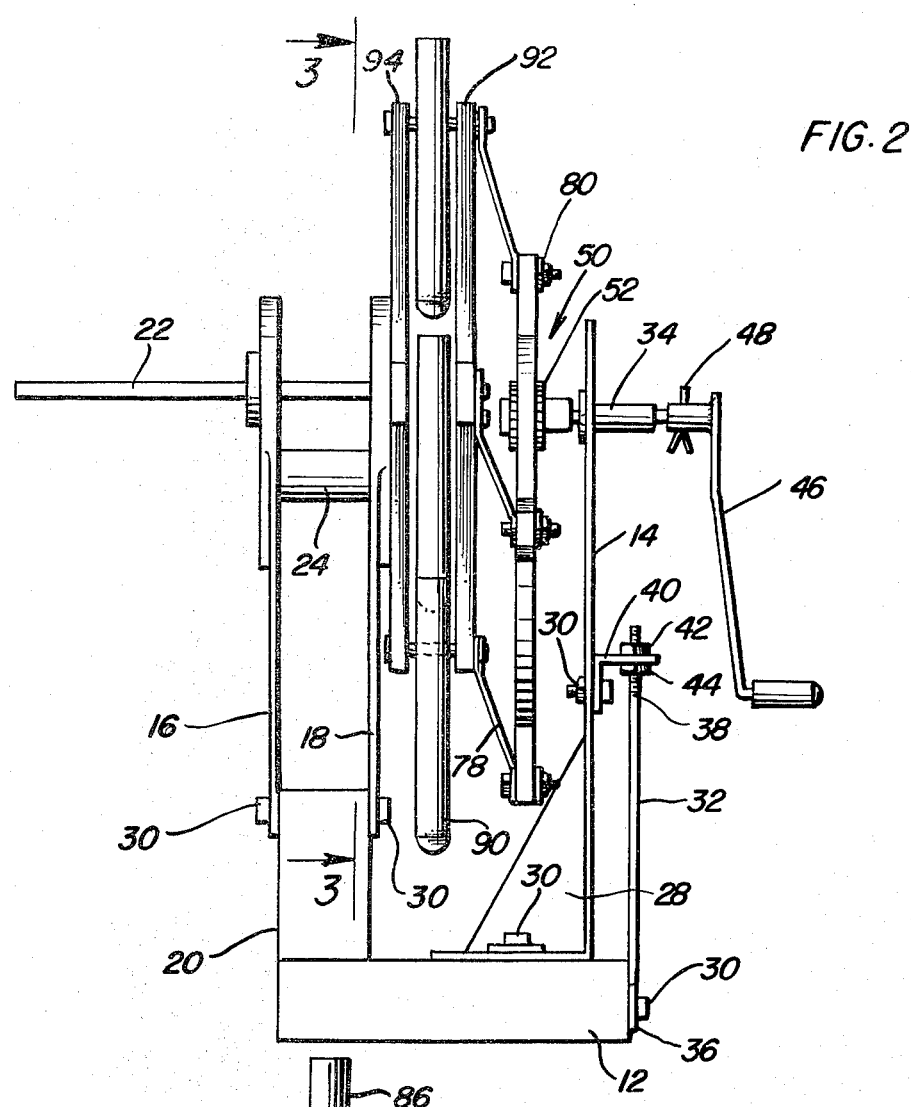
FIG. 2 is a side elevational view of the present invention illustrating the interconnection of the parts associated therewith.
Figure 3:
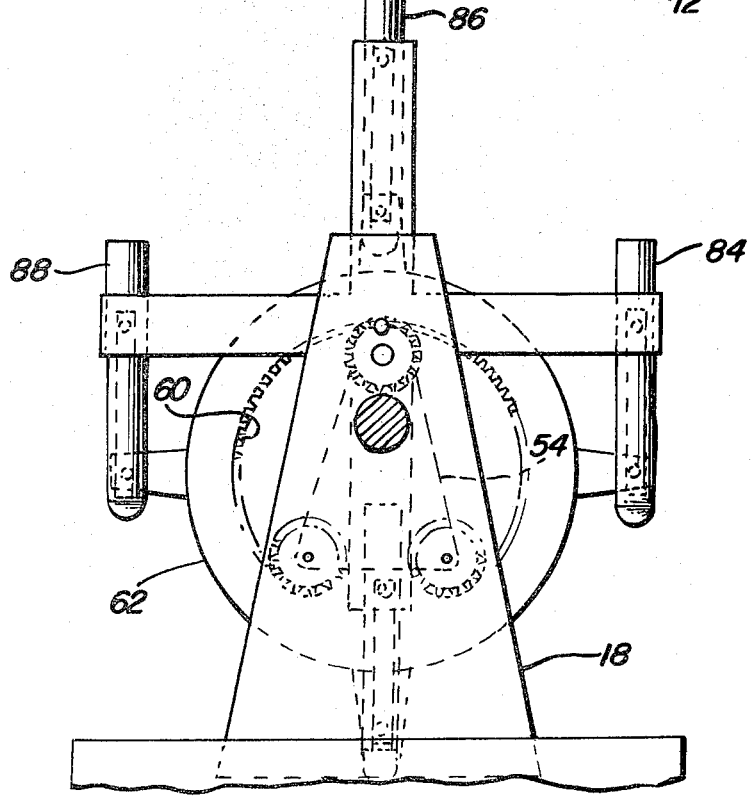
FIG. 3 is a cross-sectional view of the invention taken along the line 3—3 of FIG. 2.

With reference now to the drawings and in particular to FIGS. 1-3 thereof, a power transfer device embodying the principles and concepts of the present invention and generally designated by the reference numeral 10 will be described. In this respect, it can be seen that the power transfer device 10 includes a base member 12 having a front mounted upstanding support 14 and a pair of rearwardly mounted upstanding supports 16, 18. In this regard, the rearwardly mounted upstanding supports 16, 18 are preferably of a trapezoidal shape and are respectively mounted to opposite sides of a base support block 20 which in turn is fixedly secured to a topmost surface of the base member 12. By a respective mounting of the upstanding supports 16, 18 on respective sides of the base support block 20, a space is defined therebetween whereby an output shaft 22 may be rotatably supported in journals contained in the upstanding supports with the spacing serving to provide a desired advantageous bearing support on the shaft. To facilitate the alignment of the respective journals supporting the output shaft 22, as well as to substantially reduce flexure between the upstanding supports 16, 18, a cross support member 24 may extend across the space between the upstanding supports 16, 18 and may be respectively fixedly secured thereto.

With further reference to FIGS. 1–3 of the drawings, it can be seen that the front mounted upstanding support 14 is of a generally rectangular configuration and includes an orthogonal portion one end thereof which is directly attachable, for example by threaded attachment means 30 to a topmost portion of the base member 12. To insure the rigidity of the front mounted upstanding support 14, a triangularly shaped plate member 28 may be fixedly secured between the orthogonally aligned surfaces of the support. Of course, as is clearly illustrated, any conventional means of attaching the upstanding supports 14, 16, 18, respectively, to the base member 12 and the base support block 20 may be utilized, such as the use of conventional threaded attachment means 30.

Inasmuch as the cross support 24 is utilized between the rearwardly mounted upstanding supports 16, 18 to insure the alignment and rigidity thereof with respect to the output shaft 22, a front mounted adjustment member 32 may be operably connected to the front mounted upstanding support 14 to insure its alignment and rigidity with respect to an input shaft 34. Specifically, the adjustment member 32 may consist of a rod having a flattened portion 36 on one end thereof and a threaded portion 38 on its remaining free end. The flattened portion 36 may be conveniently provided with a through extending aperture whereby a threaded attachment means 30 may be utilized to attach the adjustment member 32 to the base member 12, while a L-shaped bracket may be provided for effecting an attachment of the adjustment member to the front mounted upstanding support 14. This attachment is accomplished by fixedly securing the L-shaped bracket 40 to the upstanding support 14 through the use of threaded connection means 30 and by further providing an aperture within the extending portion of the bracket through which the threaded portion 38 of the adjustment member may be selectively positioned. A pair of nuts 42, 44 may be provided on respective sides of the bracket 40 in threaded engagement with the threaded portion 38 of the adjustment member 32, thereby to provide the means for selectively effecting the positioning of the upstanding support 14. In effect, an upward movement of the nuts 42, 44 on the threaded portion 38 will provide a rearwardly directed movement of the upstanding support 14, while a downward positioning of the nuts on the threaded portion of the adjustment member will effect an opposite movement of the upstanding support. As such, the nuts 42, 44 may be selectively moved until the desired support and alignment of the input shaft 34 is achieved through the use of the upstanding support 14.

As to the construction of the input shaft 34, it can be seen that a handle 46 is illustrated as being operably attached thereto through the use of a cotter pin 48 or some similar attachment means, such handle serving to illustrate one method of imparting a rotative input to the power transfer device 10. Of course, it is to be realized that through a removal of the cotter pin 48, the handle 46 might be removed from the input shaft 34, thereby to permit a substitution of some other type of rotative input power source, such as an electric motor, or the like.

As can be further ascertained with reference to FIGS. 1–3 of the drawings, the remaining free end of the input shaft 34 is provided with a drive gear assembly 50 which includes a pinion or drive gear 52 fixedly secured to the free end of the input shaft 34, an idler gear mounting frame 54, and a pair of idler gears 56, 58 rotatably mounted to the idler gear mounting frame. As can be appreciated, all three of the gears 52, 56 and 58 are in operable engagement with the internal teeth 60 of a ring gear 62. Accordingly, a rotation of the input shaft 34 will impart a concurrent rotation to the ring gear 62 through the rotative force supplied by the drive gear 52.

As to the construction of the ring gear 62, it can be seen that the same may be provided with a plurality of radially extending, diametrically opposed extensions 64, 66, 68, 70. In this regard, the extensions 64, 66, 68, 70 are integrally attached to the outer peripheral edge of the ring gear 62 and are each provided with a through extending aperture on an end portion thereof to which a plurality of weight support arms 72, 74, 76, 78 may be respectively pivotably mounted. In this connection, the weight support arms 72, 74, 76, 78 are generally of a longitudinal construction and include aperture at first ends thereof to permit a rotative attachment to the respective extensions 64, 66, 68, 70 extending outwardly from the ring gear 62. Specifically, any type of connection means, such as bolt and nut assemblies 80, can be employed to rotatably attach the weight support arms 72, 74, 76, 78 to their respective extensions 64, 66, 68, 70.

With continuing reference to FIGS. 1–3, it can be seen that the remaining free ends of the weight support arms 72, 74, 76, 78 may be rotatably secured to a cruciform support 82 while being fixedly secured to a plurality of elongated weights 84, 86, 88, 90. In this regard, the cruciform support 82 includes a front cruciform member 92 and a back cruciform member 94, such front and back cruciform members being in a spaced apart relationship thereby to provide a space for the plurality of elongated weights 84, 86, 88, 90 to operably move therebetween. A center cross member, which is not particularly well illustrated in the drawings, is utilized to fixedly secure the front and back cruciform members 92, 94, respectively, together.

A particularly important constructional feature of the present invention includes the fact that each of the weight support arms 72, 74, 76, 78 are provided orthogonal extensions 96, 98, 100, 102 which are respectively rotatably positionable within the aforementioned apertures contained in the front and back cruciform members 92, 94. By the same token, the extensions 96, 98, 100, 102 are fixedly secured to the respective elongated weights 84, 86, 88, 90 in a manner whereby the respective weight support arms 72, 74, 76, 78 are at all times substantially in parallel alignment with the longitudinal axes of the associated elongated weights. By the same token, the orthogonal extensions 96, 98, 100, 102 are fixedly secured to the respective elongated weights 84, 86, 88, 90 at positions on the weights which are substantially offset from a center portion thereof, i.e., the extensions are mounted more closely to one end of the weights than to the other.

Figure 4:
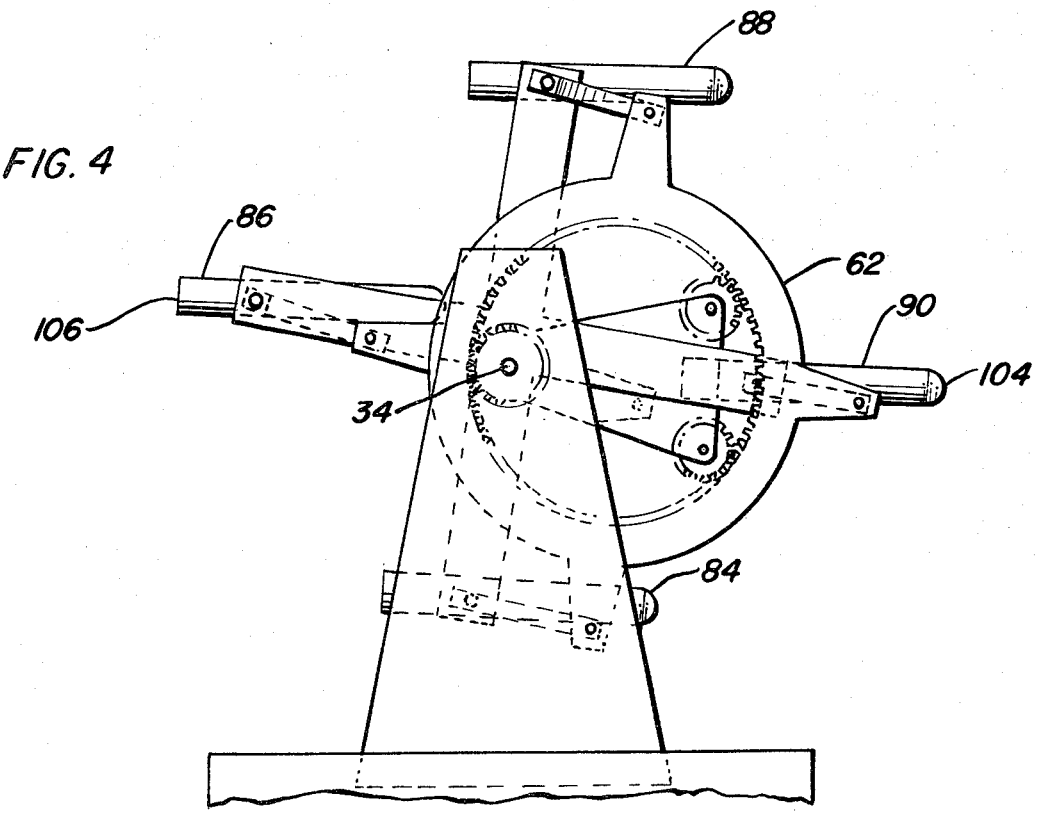
FIG. 4 is a front elevational view of the present invention illustrating the same in operation under a near full load condition.

With reference to FIG. 4 of the drawings, a description of the manner of operation of the present invention will be provided. Specifically, it can be appreciated that FIGS. 1–3 illustrate the present invention in a no-load condition whereby all of the elongated weights 84, 86, 88, 90 are in vertical alignment with the top planar surface of the base member 12. In this regard, FIG. 1 clearly illustrates the symmetrical construction realized during a no-load condition, inasmuch as the centers of the cruciform support 82 and the ring gear 62 are in general vertical alignment, as are the longitudinal axes of the elongated weights 86, 90, while the elongated weights 84, 88 are radially disposed outwardly from the input shaft 34 in a manner which imparts an equal weight distribution to opposed transverse sides thereof. Accordingly, the power transfer device 10 is in a balanced state whereby no torque is realized on the input or output shafts due to the respective positioning of the elongated weights 84, 86, 88, 90. Provided that no load is present on the output shaft 22, a rotation of the input shaft 34, either through the use of the handle 46 or another unillustrated power source, such as an electric motor, or the like, will result in the drive gear 52 imparting a rotative force to the ring gear 62. In this regard, the drive gear assembly 50 selectively positions the drive gear 52 in operable engagement with the internal teeth 60 associated with the ring gear 62 and inasmuch as minimal resistance is realized on the input shaft 34, a rotation of the ring gear will result in a concurrent rotation of the cruciform support 82 and the output shaft 22 fixedly associated therewith. As can be appreciated, due to the fact that minimal resistance is present in the power transfer device 10, the general symmetrical alignment of the parts of the invention, as illustrated in FIG. 1, will be maintained during a rotation of the input shaft 34.

At such time that a load is operably attached to the output shaft 22, the ring gear 62 will resist the rotative force supplied by the drive gear 52 and will attempt to move away from that force due to the resistance of the load. Accordingly, the ring gear 62 will shift in the direction of rotation of the drive gear 52, such shifting being permitted by the rotative movement of the weight support arms 72, 74, 76, 78 which are operably attached to the extensions 64, 66, 68, 70. As the load increases on the output shaft 22, the ring gear 62 will continue to try to move away from the force being supplied by the drive gear 52, thus gradually moving the weight support arms 72, 74, 76, 78 from their vertically aligned position illustrated in FIG. 1 to a more horizontally aligned position, as illustrated in FIG. 4. In this respect, FIG. 4 illustrates the power transfer device 10 in a near full load condition whereby the ring gear 62 has shifted as far rightwardly as is permissible by the individual lengths of the weight support arms 72, 74, 76, 78.

Referring again to the fact that the weight support arms 72, 74, 76, 78 are fixedly secured in an offset manner to the respective elongated weights 84, 86, 88, 90, it can be further ascertained with reference to FIG. 4 that during a full load condition, the elongated weights will, along with their respective weight support arms, be moved into a substantially horizontal position relative to the top planar surface of the base member 12. Due to the fact that the weight support arms 72, 74, 76, 78 are attached in an offset manner to their respective elongated weights 84, 86, 88, 90, it can be seen that the remote end 104 of the weight 90 will be substantially further offset from the rotational axis of the input shaft 34 than is the end 106 of the weight 86. By the same token, the weight of the ring gear 62 is now substantially offset from the axis of the input shaft 34, and additionally, the weights 84, 88 are substantially rightwardly positioned relative to the input shaft. Accordingly, the substantial amount of weight now positioned on one side of the input shaft as opposed to the other results in a clockwise torque being delivered to the output shaft 22, along with the torque being supplied by the input shaft 34. Effectively then, an increase in demand on the output shaft 22 is somewhat compensated for by an increase in torque supplied through the use of the elongated weights 84, 86, 88, 90 moving to an unbalanced position relative to the input shaft, although it is recognized that a substantial increase in input torque may be required on the input shaft 34 to effectively position the weights in the manner illustrated in FIG. 4.

While a preferred embodiment of the present invention has been described by reference to the included drawings, it is to be understood that numerous changes could be made to the construction of the invention without departing from the inventive concept as defined in the claims associated herewith. For example, in a further preferred embodiment of the invention, it is expected that the elongated weights 84, 86, 88, 90 could be replaced with eccentrically supported wheels, such as Farm Service tires, which might be filled with a liquid so as to be utilized as weights. With respect to the above description then, it should be realized that the optimum dimensional relationships for the parts of the invention are deemed readily apparent and obvious to one who is skilled in the art to which the invention pertains, and all equivalent relationship to those illustrated in the drawings and described in the specification, to include modification of form, size, arrangement of parts and details of operation, are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An improved power transfer device comprising:
   input means for providing operational power of said device, said input means including:
   a power input shaft;
   drive gear means operably attached to said power input shaft;
   ring gear means in operable engagement with said drive gear means, said ring gear means including a plurality of radially extending, diametrically opposed extensions having weight support arm means rotatably attached thereto;
   weight means fixedly secured eccentrically to said weight support arm means;
   cruciform support means rotatably mounted on said device and providing rotatable support to said weight means; and
   output means for providing power to a load from said device, said output means including a power output shaft connected with the cruciform support means, and means mounting the ring gear means and support arms means to perform planetating movement relative to the axis of the drive gear means responsive to a variation of load on the output shaft whereby variation of load on the output shaft will cause shifting of the center of gravity of the weight means in relation to the ring gear means and cruciform support means.

2. A power transfer device comprising a power input shaft, an output shaft, and power transmission means between the input shaft and the output shaft, the transmission means including a rotary driven member for transmitting rotation to the outpt shaft, planetary gear means including a pinion meshing with a ring gear, one of said pinion and said ring gear having a drive connection with the input shaft, weight support arms pivotally connected between the other of said pinion and said ring gear and the driven member for transmitting rotation from the gear means to the driven member, the gear means being disposed for relative movement of the ring gear and pinion axes to provide relative planetating movement of the ring gear and pinion responsive to variation of the load on the output shaft, and shiftable weights secured eccentrically on the respective support arms for movement to positions which vary the torque on the output shaft responsive to said planetating movement.

3. A device as claimed in claim 2 wherein said other of said pinion and said ring gear comprises the ring gear which is provided with internal teeth meshing with said pinion and external means pivotally mounting said support arms.

4. A device as claimed in claim 3 wherein the rotary driven member is of cruciform shape and has one of said weights and associated support arms connected to each limb thereof.

* * * * *